United States Patent [19]
Chu

[11] Patent Number: 6,021,424
[45] Date of Patent: Feb. 1, 2000

[54] BOOTH MULTIPLIER WITH LOW POWER, HIGH PERFORMANCE INPUT CIRCUITRY

[75] Inventor: Tam-Anh Chu, Milpitas, Calif.

[73] Assignee: Cirrus Logic, Inc., Fremont, Calif.

[21] Appl. No.: 08/840,215

[22] Filed: Apr. 11, 1997

Related U.S. Application Data

[63] Continuation of application No. 08/380,174, Jan. 30, 1995, Pat. No. 5,734,601.

[51] Int. Cl.[7] ....................................................... G06F 7/52
[52] U.S. Cl. ........................................................... 708/630
[58] Field of Search ................................ 364/760.03, 757

[56] References Cited

U.S. PATENT DOCUMENTS

| | | |
|---|---|---|
| 4,573,137 | 2/1986 | Ohhashi . |
| 4,575,812 | 3/1986 | Kloker et al. . |
| 4,644,488 | 2/1987 | Nathan ..................................... 364/757 |
| 4,813,008 | 3/1989 | Shigehara ........................... 364/760.03 |
| 5,146,421 | 9/1992 | Adiletta et al. . |
| 5,231,415 | 7/1993 | Hagihara ........................... 364/760.03 |
| 5,325,321 | 6/1994 | Ishida ................................. 364/760.03 |
| 5,343,417 | 8/1994 | Flora . |

FOREIGN PATENT DOCUMENTS 61-156433  7/1986  Japan .

OTHER PUBLICATIONS

Waser; High–Speed Monolithic Multipliers For Real–Time Signal Processing; IEEE 1978 pp. 19–29.

Primary Examiner—Tan V. Mai
Attorney, Agent, or Firm—Sabath & Truong; Robert P. Sabath; Peter Rutkowski

[57] ABSTRACT

A Booth multiplier for multiplying a first number with a second number to produce a product has an array of adder cells arranged in a plurality of rows of adder cells and is provided with input circuitry that reduces the power consumption of the multiplier. This input circuitry includes a plurality of Booth recoding logic cells that provide the control signals to multiplexers in the adder cells in the array. The Booth recoding logic cells receive different subsets of bits of the second number and generate the Booth recoded control signals as a function of the received subset of bits. Each Booth recoding logic cell includes balanced logic circuitry for generating all of the Booth recoded control signals from that Booth recoding logic cell at the same time. The balanced logic circuitry minimizes temporary short-circuit paths in the multiplexers in the adder cells. The input circuitry also includes a split bus that provides the first number to the array. The split bus has a first branch that provides the first number unbuffered to the top row of the array, and a second branch having a buffer circuit and providing the first number buffered to the other rows of the array. The buffer circuit has low-power, low-speed buffers since the top row is able to receive the first number unbuffered, and the remaining rows in the array do not need to receive the first number until after the top row of adder cells completes its addition.

5 Claims, 8 Drawing Sheets

BOOTH MULTIPLIER WITH LOW POWER, HIGH PERFORMANCE INPUT CIRCUITRY

This is a Continuation of application Ser. No. 08/380,174 filed on Jan. 30, 1995, U.S. Pat. No. 5,734,601.

BACKGROUND OF THE INVENTION

1. Field of the Invention

The present invention relates to the field of math processors in computers, and more particularly, to Booth multipliers used in math processors to perform high speed multiplication of numbers.

2. Description of Related Art

One of the primary functions of most computer systems is to perform a large number of mathematical operations at a speed much faster than a human being could perform the operations. Since a computer devotes a considerable amount of its processing time to performing mathematical operations, an improvement in the speed of a math processor of the computer for performing a particular type of operation will increase the overall speed of the computer.

A known method of performing multiplication in a math processor is by array multiplication using a parallel multiplier. The parallel multiplication process is based on the fact that partial products in multiplication can be independently computed in parallel. An example of multiplication by partial products is shown below in Table 1 for two 4-bit numbers.

TABLE 1

| 4-bit Multiplier Partial Products | | | | | | | |
|---|---|---|---|---|---|---|---|
| | | | X3 | X2 | X1 | X0 | Multiplicand |
| | | | Y3 | Y2 | Y1 | Y0 | Multiplier |
| | | | X3Y0 | X2Y0 | X1Y0 | X0Y0 | |
| | | X3Y1 | X2Y1 | X1Y1 | X0Y1 | | |
| | X3Y2 | X2Y2 | X1Y2 | X0Y2 | | | |
| X3Y3 | X2Y3 | X1Y3 | X0Y3 | | | | |
| P7 P6 | P5 | P4 | P3 | P2 | P1 | P0 | Product |

A parallel multiplier is normally implemented as a square array of adders. In what is known as a Radix-2 scheme, the partial products are computed by observing one bit of the multiplier at a time. A higher radix multiplier, such as a Radix-4 multiplier, or a "Booth recoding multiplier", reduces the number of adders (and therefore the delay required to produce the partial sums) by examining a plurality of bits at a time. In conventional Booth recoding, the multiplier bits are divided into two-bit pairs, and a total of three bits are scanned at a time. These three bits are: the two bits from the present pair; and a third bit from the high order bit of an adjacent lower-order pair. After examining each triplet of bits, Booth recoding logic converts the triplet into a set of five control signals used by the adder cells in the array to control the operations performed by the adder cells.

Figure 1A:
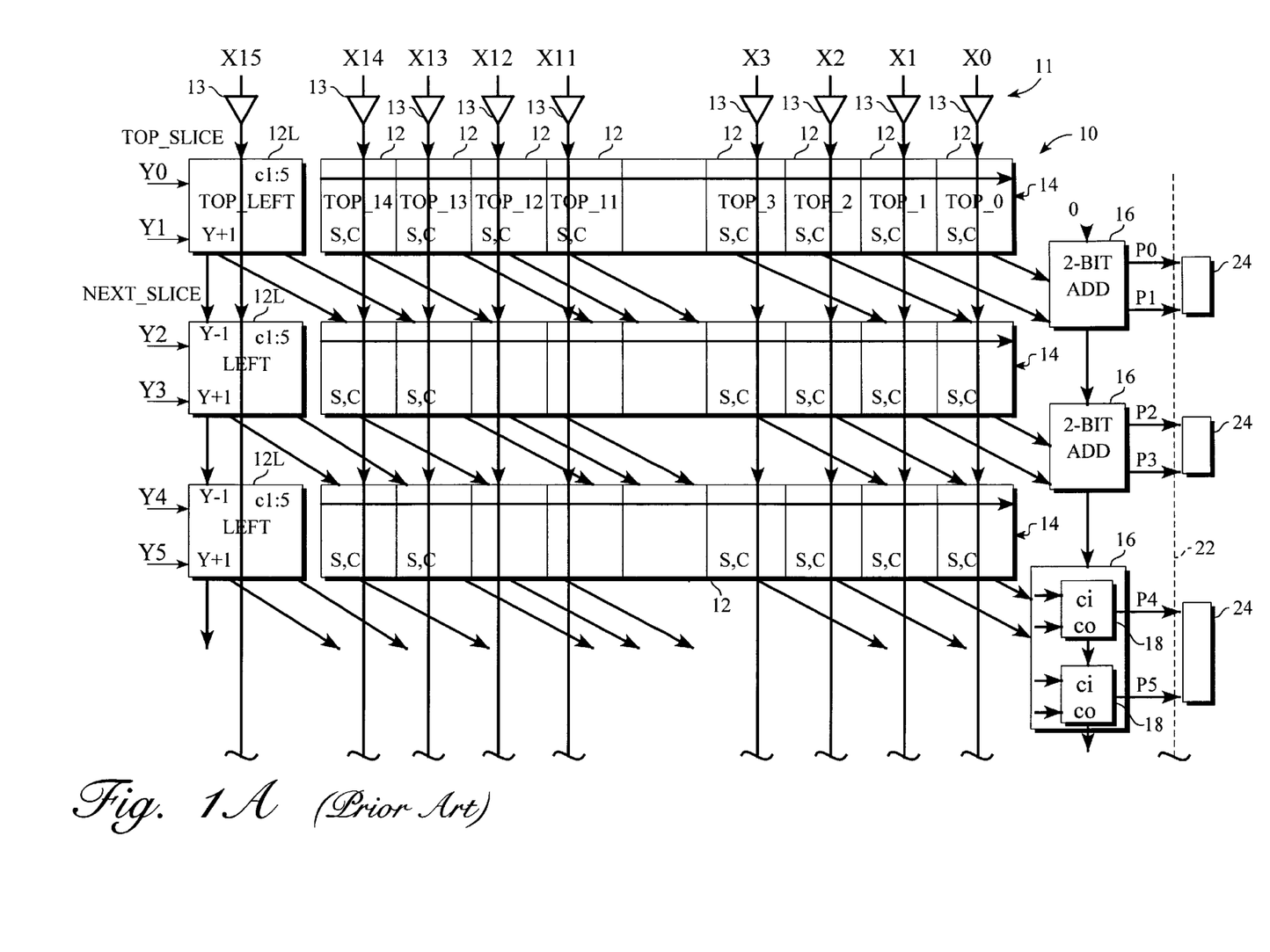
FIG. 1 is a block diagram of a prior art Booth multiplier.
Figure 1B:
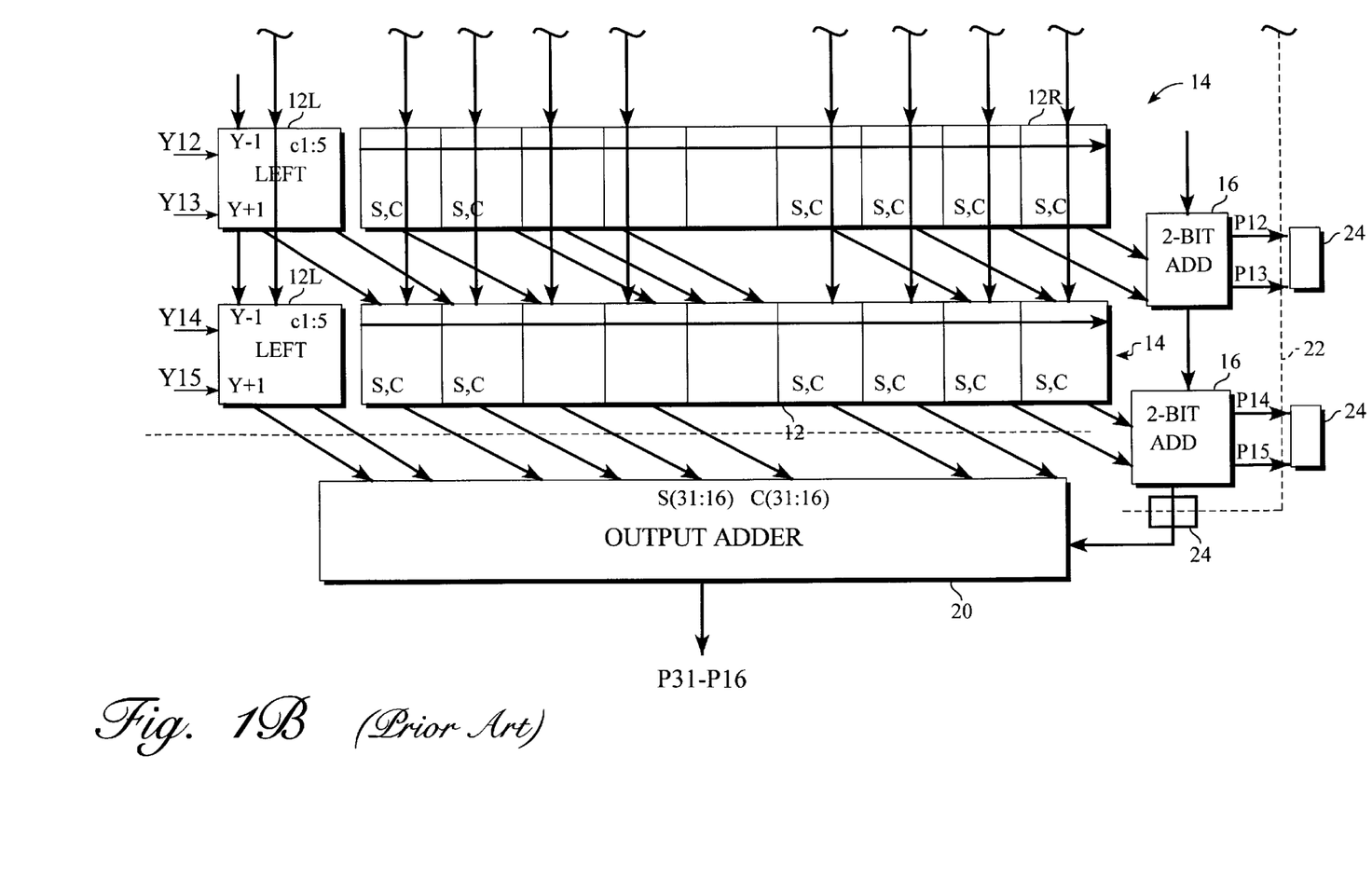

In a conventional 16×16 Booth multiplier, such as that shown in the prior art multiplier of FIG. 1, the array comprises eight rows (or "stages") of adder cells. Only eight stages are needed in the array since a plurality of bits of the multiplier are examined in each stage.

The high performance of the Booth multiplier does not come without cost, however, in the form of relatively high power consumption. This is due in part to the large number of adder cells (15 cells for 8 rows=120 core cells) that consume power. Each of the adder cells normally includes a 5-input multiplexer controlled by the five control signals generated by the Booth recoding logic. In Booth multipliers that use conventional Booth recoding logic to generate the control signals, short-circuit paths can be created by one of the control signals turning off after another signal has turned on to select one of the inputs. These temporary short-circuit paths dissipate power and increase the power consumption of a Booth multiplier.

Another large consumer of power in Booth multiplier arrangements is the input bus that provides one of the numbers (the multiplicand) to each of the eight stages (or rows) in the array. Using the same input to drive all eight stages means that there is a very large load on the multiplexers in the first stage of the array. Due to this load, the input to the array must be buffered. However, in order to provide high-speed multiplier performance, the first stage needs to receive the input with very little delay. Prior Booth multipliers therefore provided high-speed buffers to the first input stage, but these buffers consumed a sizable amount of power.

SUMMARY OF THE INVENTION

There is a need for a Booth multiplier with reduced power consumption that is achieved without decreasing the speed of the Booth multiplier.

This and other needs are met by the present invention which provides a Booth multiplier for multiplying a first number with a second number to produce a product. The Booth multiplier of the present invention comprises an array of adder cells arranged in a plurality of rows of adder cells. The adder cells perform addition on bits of the first and second numbers. One of the adder cells of each row is a left-most cell for that row. Each row of adder cells receives Booth recoded control signals formed from a different subset of bits of the second number, and each of the adder cells in each row receives a different bit of the first number. The Booth multiplier also comprises a plurality of Booth recoding logic cells, each Booth recoding logic cell coupled to the left-most cell of a different one of the rows. The Booth recoding logic cells receive different subsets of bits of the second number and generate the Booth recoded control signals as a function of the received subset of bits. Each Booth recoding logic cell includes balanced logic circuitry for generating all of the Booth recoded control signals from that Booth recoding logic cell at the same time.

The balanced logic circuitry of the Booth recoding logic cells minimizes temporary short-circuit paths in multiplexers that are located in the adder cells in the array. This minimization of the short-circuit paths greatly reduces the power consumption of the Booth multiplier.

The earlier stated needs are also met by another aspect of the present invention which provides a Booth multiplier for multiplying a first number with a second number to produce a product, comprising an array of adder cells arranged in a plurality of rows of adder cells. The adder cells perform addition on bits of the first and second numbers, the results of the additions being propagated through the array from higher rows to lower rows, a highest row being a top row of the array. Each row of adder cells receives Booth recoded control signals formed from a different subset of bits of the second number, each of the adder cells in each row receiving a bit of the first number. A split bus provides the first number to the array, this split bus including a first branch that provides the first number unbuffered to the top row of the array, and a second branch having a buffer circuit and providing the first number buffered to the other rows of the array.

The splitting of the input bus carrying the multiplicand allows the inputs to the top row of the array to be provided quickly, while the inputs to the remaining rows of the array are provided more slowly through the input buffer circuitry that is required due to the load on the multiplexers in the adder cells. Since buffer circuitry is not required before the top row, the buffer circuitry is implementable with lower-speed, lower-power buffers. This reduces the power consumption substantially in comparison to the prior art in which high-speed, high-power buffers are located before the top row of the array. The present invention therefore takes advantage of the fact that the inputs of the multiplicand to the lower rows of the array do not have to be provided until after the top row has generated its addition results.

The foregoing and other features, aspects and advantages of the present invention will become more apparent from the following detailed description of the present invention when taken in conjunction with the accompanying drawings.

DETAILED DESCRIPTION OF THE ILLUSTRATIVE EMBODIMENTS

FIG. 1 is a block diagram of a prior art 16-bit Booth multiplier with an array of adder (or "core") cells 12 arranged in eight rows 14. Each row 14 has a left-most cell 12L and a right-most adder cell 12R. The left-most cells 12L contain Booth recoding logic for generating control signals.

The sixteen bits X0–X15 of the multiplicand are provided to each row 14 of adder cells 12 via an input bus 11. The input bus 11 provides one bit of the multiplicand to each adder cell 12 of each of the eight rows 14 in the array 10. Using the same input to drive all eight rows 14 means that there is a very large load on the multiplexers located within the adder cells 12 in the first row 14 of the array 10. Due to this load, the input to the array 10 must be buffered. However, in order to provide high-speed multiplier performance, the first row 14 needs to receive the multiplicand input with very little delay. Therefore, the prior art Booth multiplier is provided with high-speed buffers 13 to the first input row 14. Since these buffers 13 are high-speed buffers, they consume a sizable amount of power.

The sixteen bits Y0–Y15 of the multiplier are divided into two-bit segments that are Booth recoded as signals c1:5 for each of the individual rows 14. Each of the left-most cells 12L includes Booth recoding logic to recode the bits of the multiplier into Booth recoded signals. The top left cell 12L therefore receives as inputs bit X15 of the multiplicand and the Booth recoded signals c1:5 representing bits Y0 and Y1 of the multiplier. The recoded signals c1:5 for bits Y0 and Y1 are also provided to each of the other adder cells 12 in the top row 14 of the array 10. The other left-most cells 12L in the array 10 receive, in addition to the respective $Y_N$ and $Y_{N+1}$ bits, the $Y_{N-1}$ bit from the previous row 14.

The individual adder cells 12 perform the appropriate action on the $X_N$ bit (shift, add, subtract) according to the Booth recoded signals c1:5, and the sum and carry results (hereafter termed "the addition results") are passed diagonally to an adder cell 12 in the next row 14 as indicated by the arrows.

A 2-bit adder circuit 16 is coupled to receive the addition results from the two right-most adder cells 12 of each row 14. Additionally, the carry-out of a 2-bit adder circuit 16 of one row 14 forms the carry-in of the 2-bit adder circuit of the next lower row 14. Each 2-bit adder circuit 16 comprises two 2-bit adders 18. Only one of the 2-bit adder circuits 16 is shown in this manner in FIG. 1 for illustration purposes, but the remainder are similarly constructed. Two bits ($P_N$, $P_{N+1}$) of the final product P are generated by each 2-bit adder circuit 16, in addition to a carry-out. The 2-bit adder circuits 16 produce the sixteen (15:0) least significant bits of the final product P.

The addition results of the bottom row 14 of the array 10 are received by a carry select adder 20, which also receives as a carry-in the carry-out of the bottom 2-bit adder circuit 16. The carry select adder 20 produces the sixteen (31:16) most significant bits of the final product P.

The Booth multiplier of the prior art is pipelined using latches. A pipeline boundary 22 along which pipeline latches 24 are placed is schematically illustrated. The carry-out from the bottom 2-bit adder circuit 18 is pipelined and forwarded to the carry select adder 20.

Figure 2A:
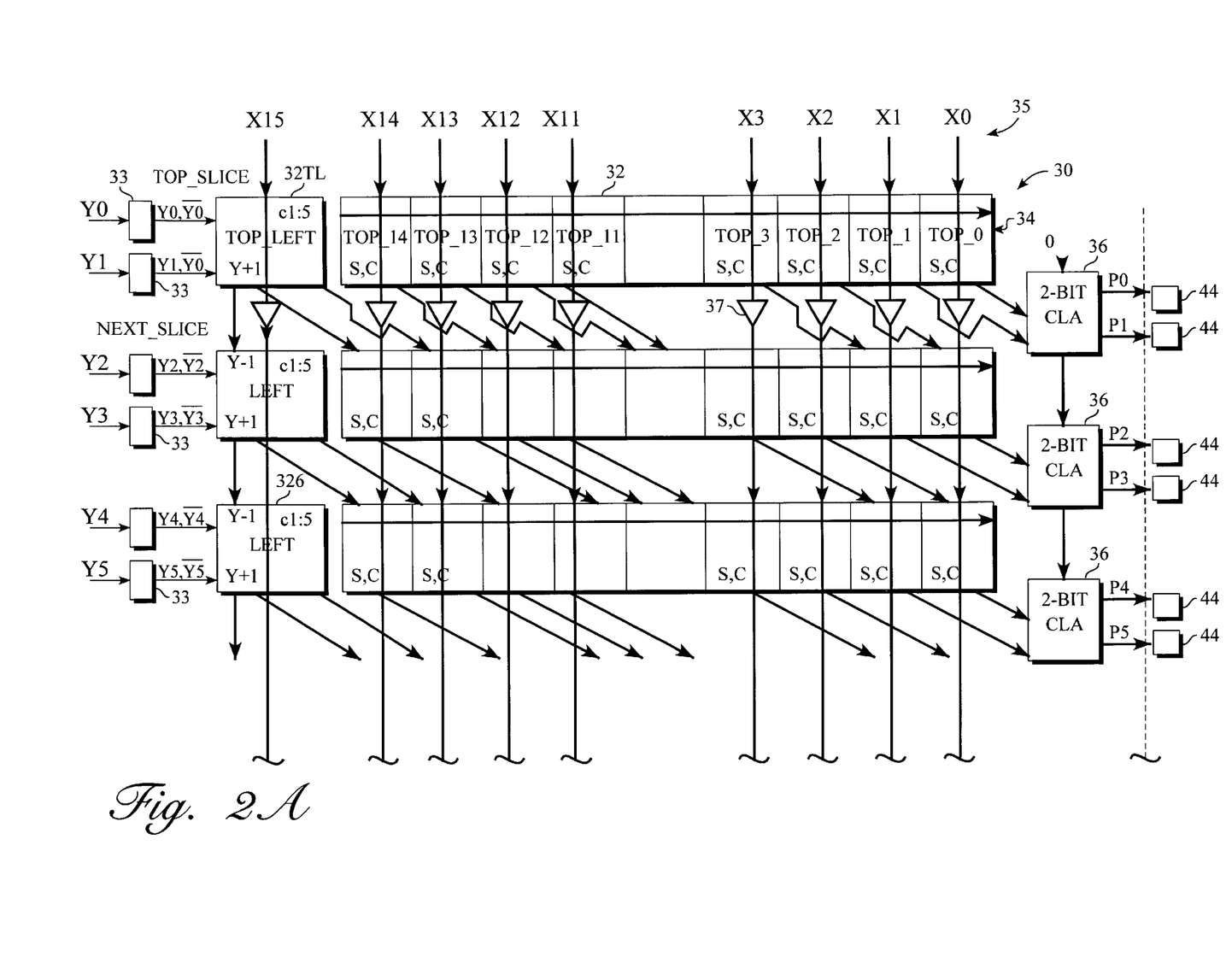
FIG. 2 is a block diagram of a Booth multiplier constructed in accordance with an embodiment of the present invention.
Figure 2B:
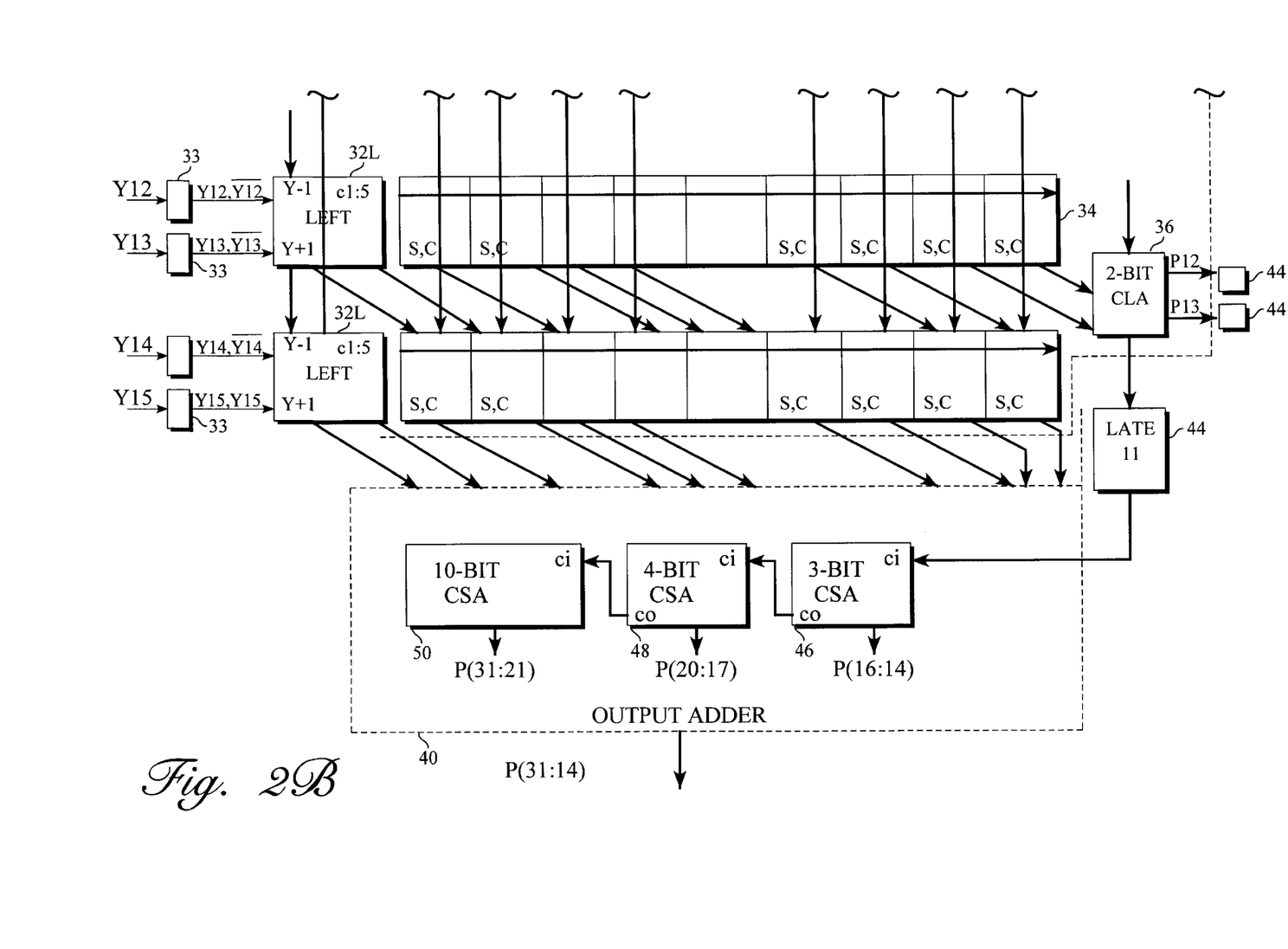

FIG. 2 is a block diagram of a Booth multiplier constructed according to an exemplary embodiment of the present invention. The 16×16 Booth multiplier of FIG. 2 has a conventional array 30 of adder cells 32 arranged in eight rows 34. This array 30 provides the addition results in the same manner and with the same adder delays as in the prior art. By improving the input circuitry, however, the present invention reduces the power consumption of a Booth multiplier compared with the Booth multipliers of the prior art, without sacrificing the high-speed performance of the multiplier. Additionally, the multiplier of the present invention reduces the total delay of a Booth multiplier by improving the delays of the output circuits of the multiplier.

The input circuitry of the present invention includes a split bus 35 that carries the X inputs (the multiplicand) to the array 30. The split bus 35 has a first branch that is connected directly to the inputs of the top row 34 of adder cells 32. Each adder cell 32 in the top row 34 receives one of the bits of the multiplicand without the bit being buffered. Thus, the top row 34 receives the multiplicand unbuffered.

A second branch of the split bus 35 includes a buffer circuit with a plurality of buffers 37. This second branch provides one bit of the multiplicand to each of the adder cells 32 in the seven other rows 34 in the array 30. These rows 34 therefore receive the multiplicand buffered by the buffers 37.

A split bus 35 is used in the present invention to take advantage of the fact that the multiplicand input (the X input) does not have to be available at the inputs of the lower rows 34 of the array 30 until after the output of the first (or top) row 34 is produced. The output of the top row 34 is produced after one adder delay, Tadd. The buffers 37 are therefore able to have a maximum delay of Tadd to drive the inputs to the other rows 34 in the array 30. Since this time Tadd is relatively large, the input buffers 37 can be implemented as low-power buffers, as long as their delay is less than Tadd.

The use of low-power buffers and a split bus as provided by the present invention significantly reduces the power consumption of the Booth multiplier in comparison to the prior art. The speed of the device is not compromised, however, as the top row 34 of the array is provided with the input directly and the remaining rows 34 are provided with the buffered input by the time the first row 34 completes its addition and produces its output to the next row 34.

Another feature of the input circuitry of the present invention also reduces the power consumption of a Booth multiplier. The Booth recoding logic provided in the left-most cells 32L and the top left cell 32TL have balanced delays between their outputs c1 to c5. The balancing of the delays causes the Booth recoded control signals (the select signals for the multiplexers within the adder cells 32) to be produced by the Booth recoding logic at the same time (or approximately at the same time). This minimizes temporary short-circuit paths in the 5-input multiplexers within the adder cells 32.

Figure 3:
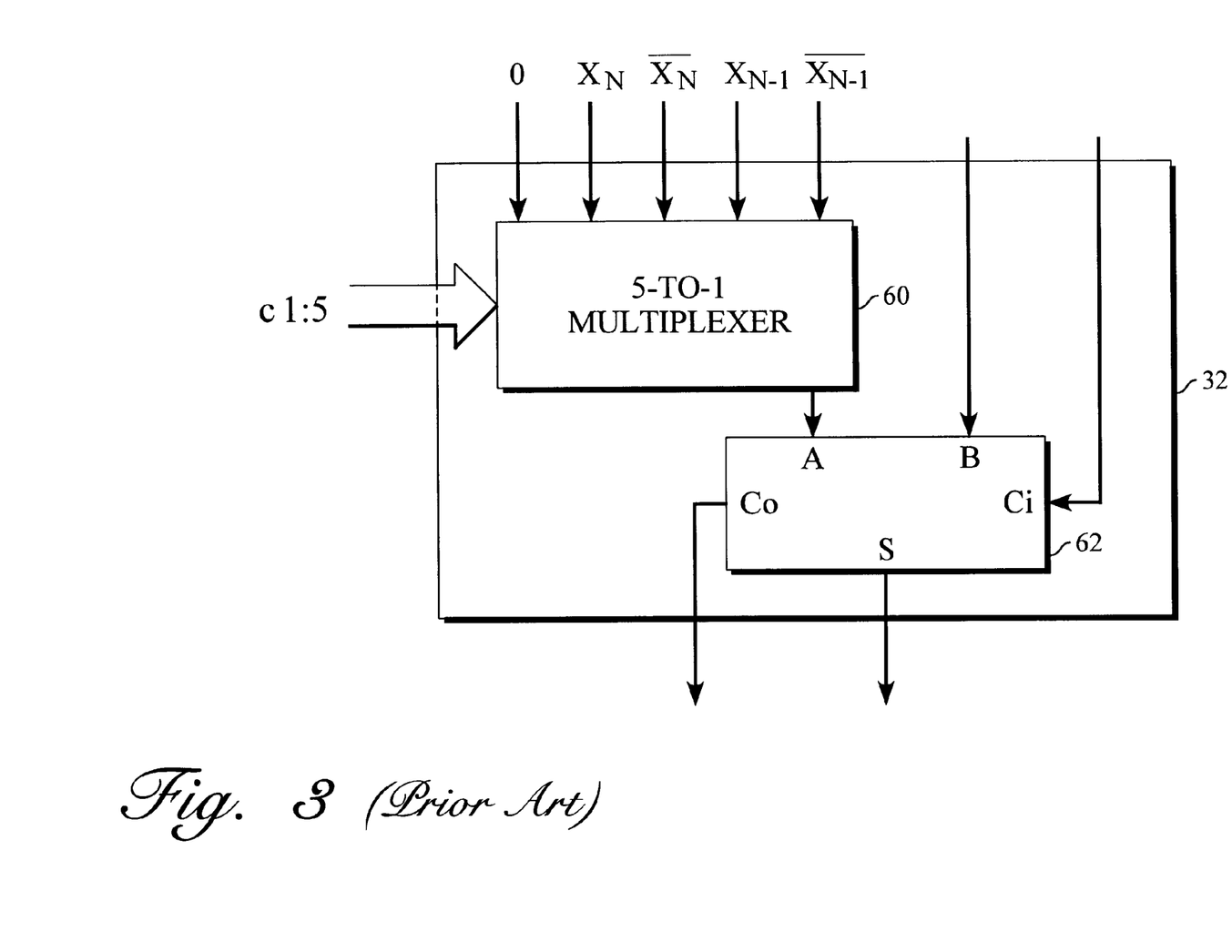
FIG. 3 is a block diagram of an exemplary embodiment of an adder cell.

An example of a conventional adder cell 32 is depicted in FIG. 3, and comprises a 5-to-1 multiplexer 60 and an adder 62. The multiplexer 60 receives as inputs bits $X_N$, $\overline{X_N}$, $X_{N-1}$, $\overline{X_{N-1}}$. Based upon the control signals (c1:5) received from the Booth recoding logic, the multiplexer 60 provides an output value to one input of the adder 62. A second input of the adder 62 receives the sum S from an adder cell 32 of the previous row 34. The adder 62 also receives a carry-in (Ci) from a carry-out of an adder cell 32 of a previous row 34. The adder cell 32 produces a carry-out (Co) and a sum bit (S) that are provided to a next row 34 in the array 34.

Each adder cell 32 is separately coupled to one of the left-most cells 32L, or to the top left cell 32TL if the adder cell 32 is in the top row 34. The top left cell 32TL and the left-most cells 32L provide each one of the adder cells 32 in their respective rows 34 with the control signals c1:5 that select the output of the multiplexer 60 in the adder cell 32.

Figure 3A:
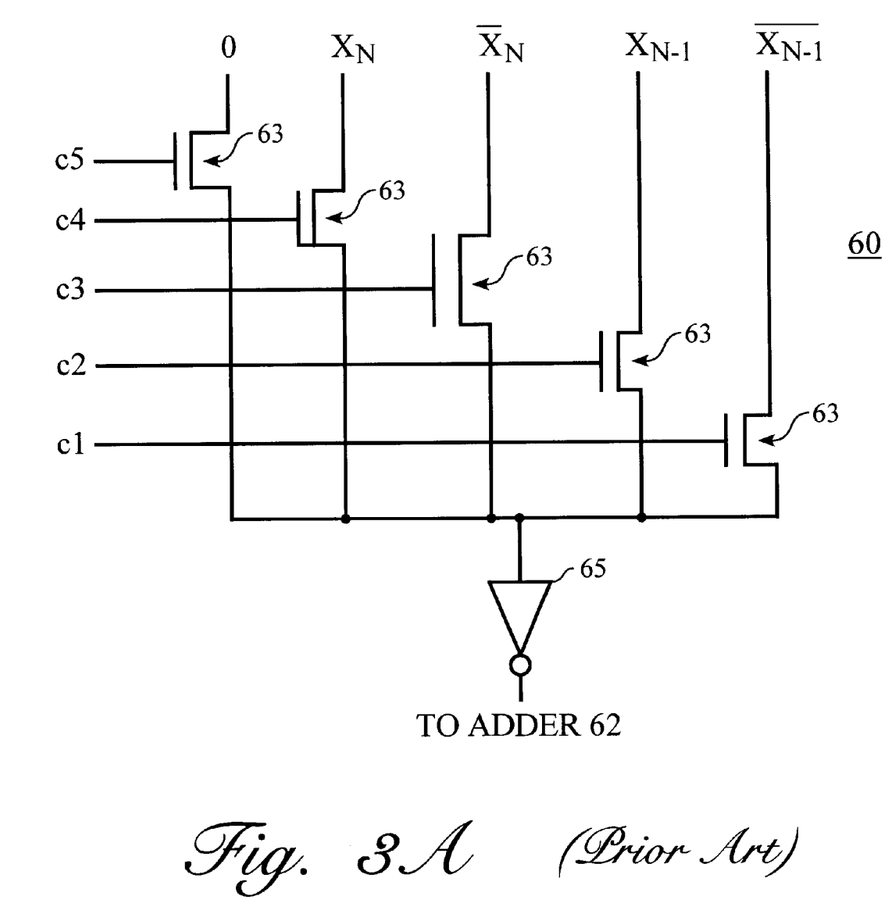
FIG. 3a is a schematic diagram of a 5-to-1 multiplexer.

An exemplary embodiment of the 5-to-1 multiplexer 60 is depicted in FIG. 3a. Each one of the control signals controls a separate transistor 63. The inputs to these transistors 63 are 0, $X_N$, $\overline{X_N}$, $X_{N-1}$ and $\overline{X_{N-1}}$. The control signals c1–c5 determine which of the input signals will be provided to an output inverter buffer 65. The adder 62 (FIG. 3) is coupled to the output inverter buffer 65.

The top left cell 32TL and the left-most cells 32L are provided with input bits of the multiplier (the Y bits) through latches 33. The latches 33 provide a non-inverted input bit Y, and an inverted bit Y to the top left cell 32TL and the left-most cells 32L. (The left-most cells 32L can also be referred to as "non-top left cells".) The present invention takes advantage of the presence of both the inverted and non-inverted values of the bits of the multiplier in order to simplify and balance the Booth recoding logic.

Figure 4:
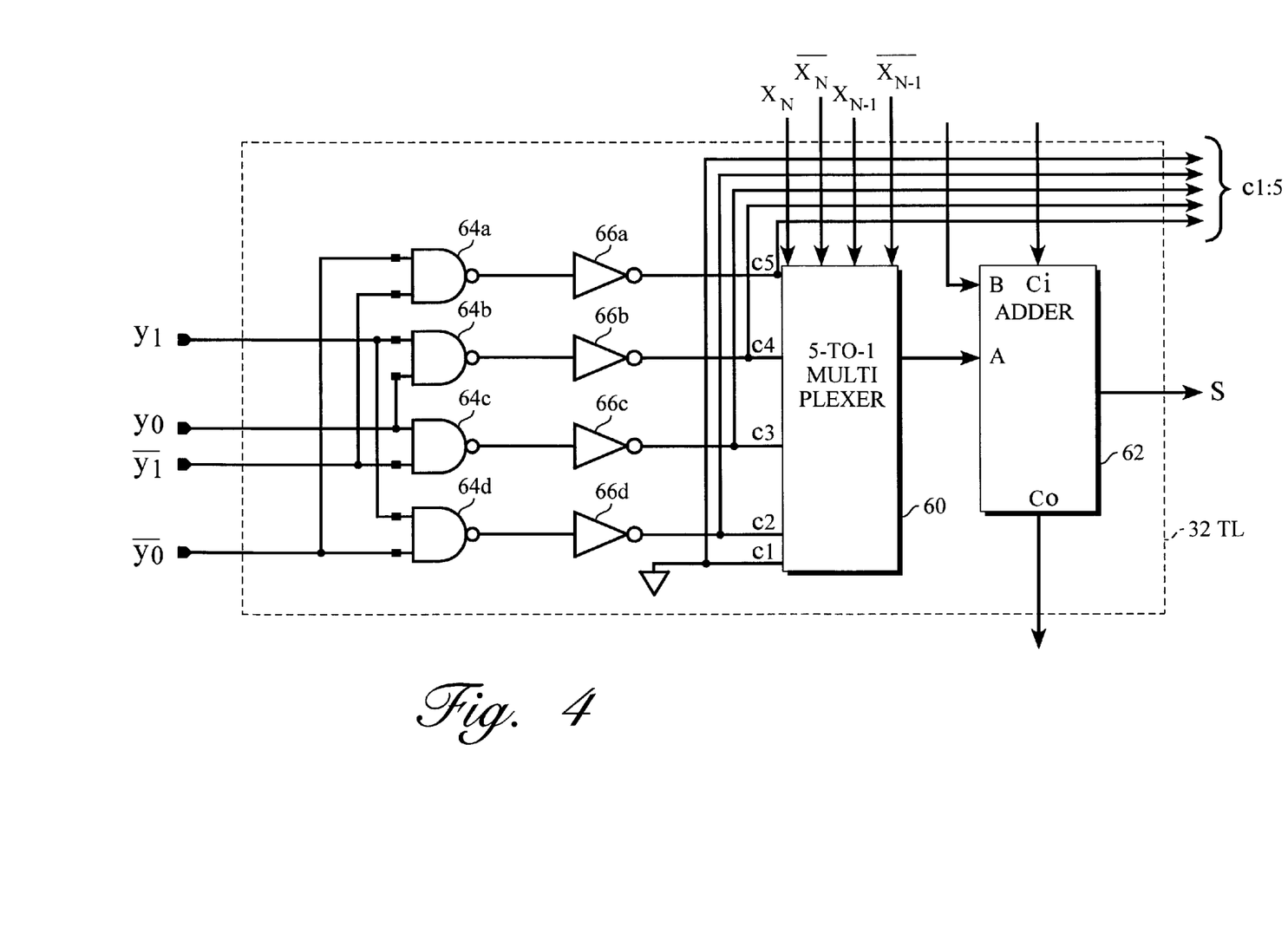
FIG. 4 is a block diagram of a top left Booth recoding cell constructed in accordance with an embodiment of the present invention.

FIG. 4 is a logic diagram of a top left cell 32TL constructed in accordance with an embodiment of the present invention. The top left cell 32TL receives bits Y0 and Y1 of the multiplier Y. It also receives the inverted values $\overline{Y0}$, $\overline{Y1}$ of these bits. The top left cell 32TL has four control signal generators implemented in the exemplary embodiment as four NAND gates 64a–d and four inverters 66a–d. The first NAND gate 64a receives the inverted values $\overline{Y0}$, $\overline{Y1}$; the second NAND gate 64b the non-inverted values Y0, Y1. The third NAND gate 64c receives the non-inverted value Y0 and the inverted value $\overline{Y1}$; the fourth NAND gate the inverted value $\overline{Y0}$ and the non-inverted value Y1.

The output signals from the NAND gates 64a–d are provided to the inverters 66a–d which produce the control signals c2:5 at their outputs. The fifth control signal c1 is formed by a low logic level signal. These control signals c1:5 are provided to each of the adder cells 32 in the top row 34. The control signals c1:5 are also provided to the multiplexer 60 and the adder circuit 62 provided within the top left cell 32TL.

The top left cell 32TL of the present invention uses relatively simple logic to generate the control signals c1:5 by taking advantage of the presence of both the inverted and non-inverted values of the bits of the multiplier Y. The balanced logic circuitry of the top left cell 32TL has balanced delays since each of the paths producing one of the control signals c2:5 comprises the same logic of a NAND gate and an inverter. The logic is also simpler (and therefore faster) than that used in the prior art since only two-input NAND gates are used. Prior art embodiments of a top left cell would use the more complicated logic contained in conventional non-top left cells, but merely ground the input provided for the signal originating from a previous row. By contrast, the present invention provides a specially designed top left cell to minimize the logic for this cell.

Figure 5:
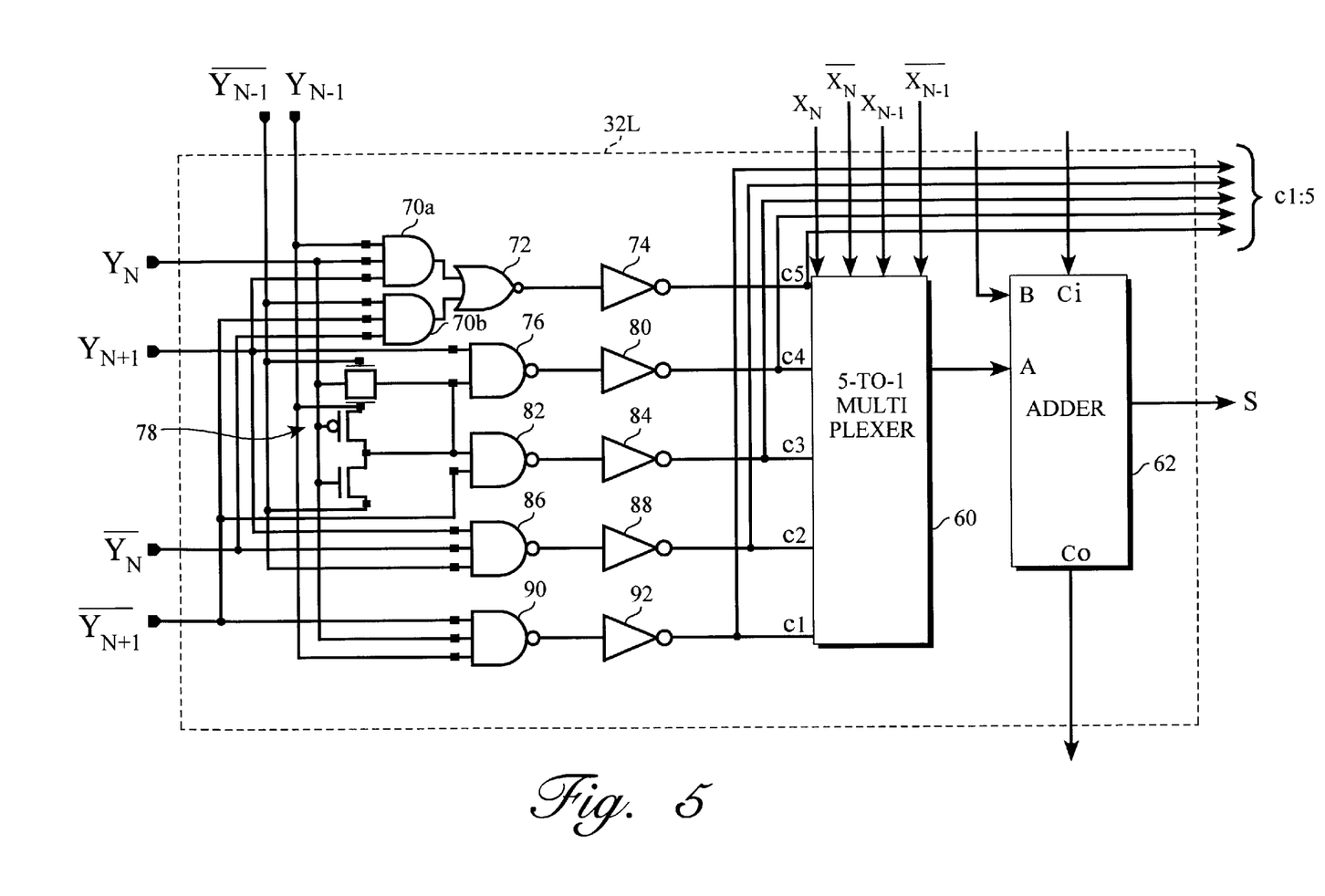
FIG. 5 is a block diagram of a non-top left Booth recoding cell constructed in accordance with an embodiment of the present invention.

FIG. 5 is a logic diagram of a non-top left cell 32L constructed in accordance with an embodiment of the present invention. As with the top left cell 32TL, the non-top left cells 32L receive the inverted and non-inverted values of $Y_N$ and $Y_{N+1}$. However, unlike the top left cell 32TL, the non-top left cells 32L also receive the inverted and non-inverted values of the lower order Y bit ($Y_{N-1}$) from the previous non-top left cell 32L or the top left cell 32TL. For example, in addition to receiving Y4, $\overline{Y4}$, Y5, and $\overline{Y5}$, the non-top left cell 32L of the third row 34 will also receive the inverted and non-inverted values of Y3 from the non-top left cell 32L of the second row 34.

The non-top left cells 32L have balanced logic circuitry that provides the control signals c1:5 at the same time (or approximately at the same time). This minimizes temporary short-circuit paths in the 5-input multiplexers within the adder cells 32. There are five control signal generators in the embodiments of FIG. 5, one for each control signal.

The first control signal generator includes a pair of 3-input AND gates 70a, 70b, a NOR gate 72 and an inverter 74. The first AND gate 70a receives the non-inverted values of $Y_N$, $Y_{N+1}$, and $Y_{N-1}$. The second AND gate 70b receives the inverted values $\overline{Y_N}$, $\overline{Y_{N+1}}$ and $\overline{Y_{N-1}}$. The output signals from these AND gates 70a, 70b are provided to the inputs of a NOR gate 72. An inverter 74 is coupled to the NOR gate 72 and generates the control signal c5.

The second control signal generator comprises a 2-input NAND gate 76 that receives at one input a non-inverted value of $Y_{N+1}$. At its other input, the NAND gate 76 receives the output of an exclusive NOR circuit 78. This exclusive NOR circuit 78 receives as inputs the inverted and non-inverted values of $Y_{N-1}$ and the non-inverted value of $Y_N$. The NAND gate 76 is coupled to an inverter 80 that generates control signal c4.

The third control signal generator includes the exclusive NOR gate 78 and a NAND gate 82. The NAND gate 82 receives the output of the exclusive NOR gate 78 at one input and the inverted value of $\overline{Y_{N+1}}$ at its other input. An inverter 84 coupled to the NAND gate 82 generates the control signal c3.

The fourth control signal generator includes a 3-input NAND gate 86 that receives the inverted value of $\overline{Y_N}$ at a first input, a non-inverted value of $Y_{N+1}$ at a second input, and an inverted value of $\overline{Y_{N-1}}$ at a third input. An inverter 88 coupled to the NAND gate 86 generates the control signal c2.

The fifth control signal generator includes a 3-input NAND gate 90 that receives the non-inverted value of $Y_N$ at a first input, the inverted value of $\overline{Y_{N+1}}$ at a second input, and a non-inverted value of $Y_{N-1}$ at a third input. An inverter 92 coupled to the NAND gate 90 generates the control signal c1.

The control signal generators of the non-top left cells 32L are balanced to produce the control signals c1:5 at approximately the same time to minimize temporary short-circuit paths in the multiplexer 60. Such short-circuit paths increase power consumption substantially. The delays are essentially balanced between the control signal generators as the 3-input NAND gates 86, 90 have approximately the same delay as the 3-input AND gates 70a, 70b combined with the 2-input NOR gate 72. These control signal generators also have approximately the same delay as the exclusive NOR gate 78 combined with the 2-input NAND gates 76, 82. Thus, although the control signal generators of the non-top left cells 32L are implemented with different logic gates, the delays produced by these gates are approximately the same, as appreciated by those of ordinary skill in the art.

The input circuitry of the present invention, including the split bus and the top left and non-top left decoding cells, considerably reduces the power consumption of a Booth multiplier but does not reduce the speed of the multiplier. The output circuitry of the Booth multiplier, as explained below, is configured to increase the speed of the multiplier without increasing the power consumption.

In order to provide optimum speed, the delay of each 2-bit adder 36 should be equal to the adder delay (1 adder delay) of an adder cell 32 in the array 30. A 2-bit adder 36 that performs with this delay requirement is a 2-bit carry lookahead adder. Accordingly, in the exemplary embodiment, each of the 2-bit adder circuits 36 in the Booth multiplier of the present invention is a 2-bit carry lookahead adder. A conventional implementation of a 2-bit carry lookahead adder can be used that will satisfy the delay requirements, and is therefore not illustrated in detail.

In the exemplary embodiment of FIG. 2, seven 2-bit carry lookahead adders 36 are provided. These adders 36 are respectively coupled to the two right-most adder cells 32 of the top seven rows 34 of the array 30. Since each 2-bit carry lookahead adder 36 operates with only 1 adder delay, the bottom adder 36 provides its carry-out signal 8 adder delays (8Tadd) after X and Y have entered the array 30.

The present invention also increases the speed (i.e., reduces the delay) of the multiplier by the repositioning of pipeline latches in comparison to conventional designs. In the present invention, as depicted in FIG. 2, pipeline latches 44 are positioned before and after the bottom 2-bit carry lookahead adder 36, which generates bits (13:12) of the final product P. This achieves an optimal total chain delay before the carry-out is generated to the output adder of eight adder delays. The trade-off for this repositioning of the pipeline latches 44 is that the output adder is required to perform a 17-bit instead of a 15-bit addition, as in the prior art.

A 17-bit output adder 40 constructed according to an exemplary embodiment of the present invention includes a 3-bit carry lookahead adder 46, a 4-bit carry select adder 48, and a 10-bit carry select adder 50. The carry-out of the 3-bit carry lookahead adder 46 is coupled to the carry-in of the 4-bit carry select adder 48, and the carry-out of the 4-bit carry select adder 48 is coupled to the carry-in of the 10-bit carry select adder 50. The output adder 40 is coupled to the bottom row 34 of the array 30. In the conventional multiplier, the output adder was not coupled to the two right-most adder cells of the bottom row. However, in the present invention, the output adder 40 is coupled to each of the adder cells 32 of the bottom row 34.

In the exemplary embodiment of the present invention, the most significant 18 bits (31:0) of the final product P are generated by the output adder 40, while the least significant 14 bits (13:0) of the final product P are generated by the 2-bit carry lookahead adders 36. The delay of the 17-bit output adder 40 of the present invention is optimized by the recognition that the inputs (the addition results from the array 30) to the output adder 40 do not arrive at the same time. Rather, the addition results arrive two or three bits at a time, delayed by a duration equal to one stage (row 34) of the array 30.

The use of a two bit carry lookahead circuit on the right side of the array, the repositioning of the pipeline latches, and the optimization of a 17-bit output adder according to the present invention provides a reduction in the total delay of a Booth multiplier, without increasing the power consumption.

Although the present invention has been described and illustrated in detail, it is clearly understood that the same is by way of illustration and example only and is not to be taken by way of limitation, the spirit and scope of the present being limited only by the terms of the appended claims.

I claim:

1. A Booth multiplier for multiplying a first number with a second number to produce a product, comprising:

an array of adder cells arranged in a plurality of rows of adder cells, the adder cells performing addition on bits of the first and second numbers, the results of the additions being propagated through the array from higher rows to lower rows, a highest row being a top row of the array, each row of adder cells receiving Booth recoded control signals formed from a different subset of bits of the second number, each of the adder cells in each row receiving a bit of the first number; and a split bus that provides the first number to the array, the split bus including a first branch that provides the first number unbuffered to the top row of the array, and a second branch having a buffer circuit and providing the first number buffered to the other rows of the array.

2. The Booth multiplier of claim 1, wherein the buffer circuit of the second branch of the split bus includes a plurality of buffers, with one of the buffers provided for each bit of the first number.

3. The Booth multiplier of claim 2, wherein each adder cell has an adder delay for performing the addition, and each of the buffers has a delay less than the adder delay.

4. A Booth multiplier for multiplying a first number with a second number to produce a product, comprising:

an array of adder cells arranged in a plurality of rows of adder cells, the adder cells performing addition on bits of the first and second numbers, the results of the additions being propagated through the array from higher rows to lower rows, a highest row being a top row of the array, one of the adder cells of each row being a left-most adder cell for that row, each row of adder cells receiving Booth recoded control signals formed from a different subset of bits of the second number, each of the adder cells in each row receiving a different bit of the first number;

a plurality of Booth recoding logic cells, each Booth recoding logic cell coupled to the left-most cell of a different one of the rows, the Booth recoding logic cells receiving different subsets of bits of the second number and generating the Booth recoded control signals as a function of the received subset of bits, wherein each Booth recoding logic cell includes balanced logic circuitry for generating all of the Booth recoded control signals from that Booth recoding logic cell at the same time; and a split bus that provides the first number to the array, the split bus including a first branch that provides the first number unbuffered to the top row of the array, and a second branch having a buffer circuit and providing the first number buffered to the other rows of the array.

5. The Booth multiplier of claim 4, wherein one of the Booth recoding logic cells is a top left recoding cell that is coupled to the left-most adder cell of a top row of adder cells in the array, wherein the balanced logic circuitry of the top left recoding cell includes a plurality of control signal generators formed by logic gates, each control signal generator receiving either an inverted value or a non-inverted value for each of two adjacent bits of the second number.

* * * * *